United States Patent [19]

Sauterey

[11] Patent Number: 5,322,886
[45] Date of Patent: Jun. 21, 1994

[54] PRODUCTION OF POLYCHLOROPRENE LATEXES

[75] Inventor: Francois Sauterey, Chant sur Drac, France

[73] Assignee: Distugil, Courbevoie, France

[21] Appl. No.: 698,820

[22] Filed: May 13, 1991

[30] Foreign Application Priority Data

May 11, 1990 [FR] France ................. 90 05886

[51] Int. Cl.⁵ ............................. C08J 3/02
[52] U.S. Cl. ..................... 524/707; 524/745; 524/747; 524/834
[58] Field of Search ............ 524/747, 834, 707, 745

[56] References Cited

FOREIGN PATENT DOCUMENTS 2536970 3/1977 Fed. Rep. of Germany .
2333818 8/1976 France .

Primary Examiner—Joseph L. Schofer
Assistant Examiner—Peter D. Mulcahy
Attorney, Agent, or Firm—Burns, Doane, Swecker & Mathis

[57] ABSTRACT

Polychloroprene latexes, well suited for the production of adhesives, are prepared by (co)polymerizing chloroprene, in aqueous emulsion, in the presence of a free-radical initiator and at least one emulsifying agent, said aqueous emulsion further comprising (a) at least one non-carboxylic ionic surfactant and (b) at least two nonionic surfactants, the HLB values thereof differing by at least 3 units.

14 Claims, No Drawings

PRODUCTION OF POLYCHLOROPRENE LATEXES

BACKGROUND OF THE INVENTION

1. Field of the Invention

The present invention relates to the improved free-radical polymerization of chloroprene or copolymerization of chloroprene with appropriate comonomers in aqueous emulsion, in the presence of an emulsifying system which does not contain carboxylic acid soaps.

2. Description of the Prior Art

The chloroprene polymers are formed in a conventional manner by emulsion polymerization, in the presence of emulsifiers. When the polymerization is carried out in an alkaline medium, the emulsifiers usually comprise alkali metal salts of colophony.

However, for certain applications, such as formulations for adhesives comprising a solvent, the presence of colophony in too high an amount is liable to cause a separation of the phases in the presence of metal oxides and is therefore not desirable. When polymerization in an acid medium is necessary, for example in order to copolymerize chloroprene with olefinically unsaturated carboxylic acids, the use of colophony is not possible because of the pKa of the corresponding resinic acids. Other ionic surfactants must then be used, such as those containing sulfate or sulfonate groups.

FR-A-2,333,818 describes a process for the production of concentrated polychloroprene latexes using, per 100 parts of monomers, from 3 to 6 parts by weight of ionic emulsifiers, if necessary conjointly with 0.5 to 6 parts by weight of nonionic emulsifiers. These relatively high proportions of ionic emulsifier of the sulfonate or sulfate type present several disadvantages. During the polymerization, the exothermic reaction is difficult to control, with the possibility that the heat generated will exceed the heat transfer capacity of the polymerization apparatus. Control of the reaction is the more difficult the higher the concentration of monomers in the aqueous phase; however, for numerous applications it is desirable to use a latex having a high solids content, preferably of at least 55%.

It is also known that the conjoint addition of a nonionic agent permits costabilization of the emulsion and lowering of the gel point. According to the aforesaid published French application, the amount of ionic emulsifier may, however, not be decreased to a proportion of below 3% of the polymerizable monomers. Moreover, the use of large amounts of nonionic compounds has adverse consequences as regards the reaction kinetics and for the control of the particle size distribution.

Another disadvantage of the use of high proportions of ionic emulsifier of the sulfate or sulfonate type is the fact that it is difficult, or even impossible, to destabilize the resulting latex by means of low temperature in order to isolate the polymer.

On the other hand, the use of latexes in this state may present another problem in certain cases because of a lack of colloidal stability in the presence of polyvalent metal ions. In certain fields of application, such as, for example, reaggregation, impregnation or aqueous adhesive formulations, it is desirable that the latex does not coagulate prematurely in the presence of ions such as $Ca^{++}$, $Zn^{++}$, $Al^{+++}$ or others which may be present in the respective compositions.

FR-A-2,231,725 and CA-A-1,031,489 describe a process for preparing polychloroprene latexes which do not coagulate during the addition of electrolytes or other materials present in the latex-based compositions, for example zinc oxide. According to such process, the chloroprene is polymerized in an emulsion devoid of carboxylic soaps but in the presence of a polyvinyl alcohol. The latex obtained lacks stability on storage as a consequence of hydrolysis of the colloid.

SUMMARY OF THE INVENTION

Accordingly, a major object of the present invention is the provision of a improved process for the polymerization of chloroprene in the absence of carboxylic soaps, to prepare latexes which are stable on storage and resistant to polyvalent metal ions, and which improved process avoids or at least conspicuously ameliorates the above disadvantages and drawbacks to date characterizing the state of this art Another object of the present invention is the provision of thus stable and resistant polychloroprene latexes that have a high solids content.

Yet another object of this invention is the provision of an improved process for the polymerization of chloroprene that does not require the presence of carboxylic soaps, permitting latexes to be produced which can be destabilized by the low-temperature technique.

Another object of this invention is the provision of chloroprene copolymer latexes which contain functional groups, in particular carboxylic groups, and which are stable on storage and resistant to polyvalent metal ions.

Briefly, the present invention features a process for the production of polychloroprene latexes by polymerization, in aqueous emulsion, of chloroprene or of a mixture of chloroprene with up to 50% by weight of other comonomers copolymerizable therewith, in the presence of a free radical initiator and an emulsifying agent, and wherein the emulsifying system comprises (a) at least one non-carboxylic ionic surfactant and (b) at least two nonionic surfactants which differ from one another in respect of their HLB number by a value of 3 or more units.

DETAILED DESCRIPTION OF THE PREFERRED EMBODIMENTS OF THE INVENTION

More particularly according to the present invention, the chloroprene may be polymerized either alone or as a mixture with up to 50% by weight of one or more comonomers copolymerizable with chloroprene, such as vinyl aromatic compounds, for example styrene, vinyltoluenes or vinylnaphthalenes; unsaturated monocarboxylic and dicarboxylic acids, for example acrylic acid, methacrylic acid, itaconic acid, maleic acid, vinylacetic acid or 2-(carboxymethyl)acrylic acid; the ester and nitrile derivatives of unsaturated carboxylic acids, in particular alkyl acrylates and alkyl methacrylates in which the alkyl group has 1 to 6 carbon atoms, acrylonitrile or methacrylonitrile; conjugated diolefins, for example 1,3-butadiene, isoprene, 1-chlorobutadiene, 2,3-dichlorobutadiene or 2,3-dimethylbutadiene; and vinyl esters, ethers and ketones, for example vinyl acetate, methyl vinyl ether or methyl vinyl ketone.

In a preferred embodiment of the invention for producing latexes and rubbers containing functional groups, the chloroprene is copolymerized with an $\alpha,\beta$-unsaturated carboxylic acid in an amount which may be up to 10% by weight relative to the total amount of monomers. By the term "monomers" is intended the total amount of chloroprene, carboxylic acid and, where appropriate, another unsaturated monomer which does not contain a free carboxylic group, such as those indicated above. Acrylic acid and methacrylic acid are more particularly preferred, in an amount of 1% to 5% by weight and more preferably of 1.5% to 2.5%. The following are more particularly representative as the other monomer: acrylic and methacrylic esters and in particular methyl methacrylate.

The presence of an ionic surfactant is essential for the physicochemical stability of the emulsion. It is advantageous that this surfactant be anionic and stable to acids. Exemplary non-carboxylic surfactants comprise the alkali metal salts or ammonium salts derived from sulfuric acid or from phosphoric acid, such as the sodium, potassium or ammonium salts of alkyl sulfates, aryl sulfates, alkylaryl sulfates, alkylsulfonates, arylsulfonates, alkylarylsulfonates, alkyl phosphates, aryl phosphates, alkylaryl phosphates, alkoxyethylsulfonates of alkoxyethylphosphonates. The alkyl radicals of such surfactants are usually groups having a medium or long chain having from 8 to about 25 carbon atoms. Representative surfactants comprise sodium lauryl sulfate, sodium laurylsulfonate, sodium alkanesulfonates or sodium paraffin-sulfonate, sodium dodecylbenzene-sulfonate, sodium dodecylbenzene sulfate and sodium isothionates.

According to the invention, at least two nonionic surfactants which have HLB numbers which differ by at least 3 units are used in combination with the anionic surfactant. The HLB (hydrophilic/lipophilic balance) number is known or may be calculated using the equation $HLB=E/5$ where E is the % by weight of hydrophilic units. Compare in this regard *Encyclopedia of Emulsion Technology*, Vol. 1, Basic theory, Paul BECHER (1 983), pp. 217–220. The difference between the HLB numbers of the two nonionic surfactants is preferably more than 4 units. The two surfactants may be of hydrophilic nature ($HLB>11$) or of lipophilic nature ($HLB \leq 11$).

To suitably carry out the process of the invention, it is often preferable to conjointly use a lipophilic surfactant and a hydrophilic surfactant in order to produce concentrated latexes which are not sensitive to polyvalent ions.

The nonionic surfactants are described, for example, in the publication *Surfactant Science Series*, Vol. 19, edited by John Cross (1987), pp. 3–28. The following are representative examples: polyoxyethylenated mono-, di- and trialkylphenols, in particular, for example, octylphenol polyglycol ether, nonylphenol polyglycol ether, dinonylphenol polyglycol ether, triisobutylphenol polyglycol ether and dodecylphenol polyglycol ether; polyoxyethylenated and/or polyoxypropylenated alcohols, in particular polyoxyethylenated fatty alcohols; polyoxyethylenated and/or polyoxypropylenated esters of carboxylic acids, in particular fatty acid esters, such as polyoxyethylene laurate, stearate or oleate; polyoxyethylenated monoglycerides and diglycerides; polyoxyethylenated and/or polyoxypropylenated fatty acid alkylamides; sorbitan esters or polyoxyethylene sorbitan esters, in particular sorbitan monolaurate or polyoxyethylene sorbitan monolaurate and ethylene oxide/propylene oxide block copolymers.

The amounts of emulsifiers used are governed by the stability and the viscosity of the emulsion during the polymerization, as a function of the system selected and the nature and the monomer concentration of the emulsion.

The amount of ionic surfactant advantageously ranges from 1 to 3 parts by weight per 100 parts by weight of monomer(s), preferably from 1.8 to 2.8 parts and more preferably from 1.8 to 2.2 parts. The nonionic surfactants are used in a total amount of 1 to 3 parts per 100 parts by weight of monomer(s) in accordance with a ratio by weight ranging from ⅓ to 3/1. The ratio will be shifted in favor of the more organophilic surfactant in the event that a low-temperature destabilization is intended. Conversely, the ratio may be shifted in favor of the more hydrophilic surfactant in the event that the latex is to be used in this form.

Thus, the combined use of three surfactants corresponding to three distinct molecules has been described above. It will of course be appreciated that it is possible to replace the ionic surfactant and one of the two nonionic surfactants with a single molecule bearing these two different functional groups.

It is possible, for example, to employ a lauryl alcohol containing 12 moles of oxyethylene (for example Polystep B 23 marketed by STEPAN Europe).

The process according to the invention, therefore, also features the use of an ionic surfactant and one of the two nonionic surfactants in the same single molecule.

The total amount (ionic surfactant+nonionic surfactants) advantageously ranges from 3 to 6 parts per 100 parts by weight of monomer(s) and more preferably from 3.5 to 5 parts.

The polymerization is carried out in conventional manner, continuously or discontinuously, in the presence of free-radical initiators and a chain transfer agent and/or elementary sulfur. The concentration of monomers present in the emulsion advantageously ranges from 30% to 70% by weight of the total weight of the emulsion. For the production of a latex having a high solids content, 50 to 95 parts of water are used per 100 parts per weight of monomers.

The free-radical initiators used are the customary organic or inorganic peroxides or redox systems. The chain transfer agents or modifiers may be selected from among iodoform, alkylxanthogen disulfides, alkyl mercaptans or other sulfur-containing organic compounds.

The presence of a dispersing agent such as, for example, the condensation product of formaldehyde and naphthalenesulfonic acid is not required to properly carry out the process of the invention. However, small amounts may be added to the mixture before, during or after the polymerization.

The polymerization temperature advantageously ranges from 30° to 70° C. and preferably from 40° to 60° C. In the event that the polymerization is carried out in an acid medium, the pH of the emulsion may be adjusted to the desired value by addition of an inorganic or organic acid, for example acetic acid. The exothermic character of the reaction and the variations in pH during the reaction may, if appropriate, be controlled by the addition of an electrolyte.

When the desired degree of conversion has been attained, the polymerization is terminated by addition of customary inhibitors. The process of the invention permits high degrees of conversion to be achieved, which can be higher than 95%. After removal of the residual monomer and optional addition of antioxidants, the latex may be stored in this form or the rubber may be isolated in any manner, for example by coagulation on a cold drum, washing and drying.

The use of the emulsifying system according to the invention enables preparation of stable latexes of chloroprene polymers, and, in particular, latexes which contain reactive groups, have a high solids content and present the advantage of being resistant to polyvalent metal ions and usable within a very wide pH range. In addition, the process enables the particle size distribution to be controlled by varying the nature and the proportion of nonioic surfactants. One of the most significant applications of these latexes and rubbers is for the preparation of adhesives. The polychloroprene latexes comprising carboxylic functional groups are used, for example, for adhering metal sheets onto a cellulose substrate, polyurethane foam panels or expanded polystyrene panels. The latex may be incorporated, without disadvantage, into formulations containing zinc oxide, magnesium oxide or other fillers, such as clays, chalk, etc.

The latexes may also advantageously be used in the construction industry as an additive to cements, for example for the reaggregation of cement slabs or the production of floating slabs.

In order to further illustrate the present invention and the advantages thereof, the following specific examples are given, it being understood that same are intended only as illustrative and in nowise limitative.

In said examples to follow, all parts and percentages are expressed by weight unless indicated otherwise.

Determination of the stability to $Ca^{++}$ ions 20 g of latex to be tested were introduced into a 150 ml beaker. A 10% aqueous solution of calcium chloride was added dropwise to the latex, which was stirred with a glass rod. The number of ml poured before a coagulation was produced was measured. If the coagulation had not begun after introducing 100 ml, the determination was stopped.

Determination of mechanical stability

The latex to be tested was diluted with water to a concentration of 40% by weight of solids. 200 ml of dilute latex were introduced into a HAMILTON stirred vessel. 5 g of anti-foam were added and the latex was stirred at 10,000 revs/min for 30 min. The latex was then filtered on a previously weighed 100-mesh sieve. After filtration, the sieve was dried for 30 min at 140° C. and then weighed. The result is expressed in % by weight of dry residue per 100 g of latex.

Stability on storage

This was judged to be "excellent" if no destabilization was observed after storage for 6 months at ambient temperature and to be "good" if no destabilization was observed after storage for 3 months.

Solids content

The solids content of the latexes was determined by removing the water and other volatile components from a previously weighed sample, at 145° C. in a vacuum oven. The solids content is expressed in % relative to the weight of the initial sample.

EXAMPLE 1

| Polymerization recipe | Parts by weight |
| --- | --- |
| Chloroprene | 98 |
| Methacrylic acid | 2 |
| Softened water | 65 |
| n-Dodecyl mercaptan | 0.2 |
| Secondary n-alkanesulfonate EMULSOGEN EP (HOECHST) | 2 |
| Polyoxyethylene/polyoxypropylene/ polyoxyethylene block polymer (HLB = 2.7) PLURONIC 3100 (BASF) | 1.25 |
| Polyoxyethylene polyoxypropylene/ polyoxyethylene block polymer (HLB = 8.3) PLURONIC 6400 (BASF) | 1.25. |

The polymerization was carried out at 45° C. under a nitrogen atmosphere at a pH of 3, adjusting the delivery of initiator consisting of a 4% aqueous solution of sodium persulfate to a suitable value.

The polymerization was terminated at a degree of conversion of 99% by addition of a chloroprene emulsion containing 0.01 part of butylcatechol and 0.003 part of phenothiazine.

The residual monomer was then removed by entrainment in steam. The stripped latex had a solids content of 64% and an average particle diameter of 150 nm.

The stability of the latex was evaluated as described above:

| (i) | Mechanical stability at | pH 3 | 0.5% of dry residues, |
| --- | --- | --- | --- |
| | | pH 7 | 0% of dry residues, |
| | | pH 12 | 0% of dry residues. |

(ii) Stability to $Ca^{++}$ ions < 100 ml (no coagulation),
(iii) Stability on storage: excellent.

EXAMPLE 2

| Polymerization recipe | Parts by weight |
| --- | --- |
| Chloroprene | 79 |
| Methacrylic acid | 1 |
| Methyl methacrylate | 20 |
| Softened water | 95 |
| n-Dodecyl mercaptan | 0.2 |
| Secondary n-alkanesulfonate EMULSOGEN EP (HOECHST) | 2.5 |
| Tributylphenol glycol ether containing 4 moles of EO (HBL = 8) SAPOGENAT T040 (HOECHST) | 1.25 |
| Tributylphenol polyglycol ether containing 30 moles of EO (HBL = 17) SAPOGENAT T300 (HOECHST) | 1.25. |

The polymerization was carried out under a nitrogen atmosphere at 45° C., controlling the delivery of initiator consisting of a 4% aqueous solution of sodium persulfate. The pH of the emulsion was 2.2.

The polymerization was terminated at a degree of conversion of 99.8% by addition of an emulsion containing 0.01 part of t-butylcatechol and 0.03 part of phenothiazine. The emulsion was adjusted to a pH of 7 using a NaOH solution and the residual monomer was then removed by entrainment in steam.

The final latex had a solids content of 53% and an average particle diameter of 125 nm.

| (i) | Mechanical stability at | pH = 7 | 0.1% of residues, |
| --- | --- | --- | --- |

-continued

| | |
|---|---|
| pH = 12 | 0% of residues. |

(ii) Stability to Ca++ ions > 100 ml (no coagulation),
(iii) Stability on storage = excellent.

EXAMPLE 3

| Polymerization recipe | Parts by weight |
|---|---|
| Chloroprene | 100 |
| Softened water | 100 |
| n-Dodecyl mercaptan | 0.2 |
| Secondary n-alkanesulfonate EMULSOGEN EP (HOECHST) | 2 |
| Tributylphenol polyglycol ether containing 4 moles of EO (HLB = 8) SAPOGENAT T040 (HOECHST) | 1.5 |
| Tributylphenol polyglycol ether containing 30 moles of EO (HLB = 17) SAPOGENAT T300 (HOECHST) | 1.5. |

The polymerization was carried out in accordance with the procedure described in Example 1.

The polymerization was terminated at a degree of conversion of 80%.

Polymerization time: 5 hours. No coagulate formed during the reaction. The maximum temperature difference observed between the jacket and the reactor was 4° C.

The solids content of the latex obtained was 41% with an average particle diameter of 145 nm.
(i) Mechanical stability at pH=7 0.6% of residues,
(ii) Stability to calcium ions > 100 ml.

EXAMPLES 4 TO 34

All of the polymerizations were carried out as in Example 1.

Examples 4 to 26, according to the invention, are indicated, with results thereof, in Tables I to IV.

Examples 27 to 34 (Table V) are comparative examples. Examples 27 to 30 indicate the effect of the amount of sulfonate, used as the sole surfactant, on the exothermic character of the reaction, on the stability of the emulsion during the polymerization and on the mechanical stability and the stability to calcium ions of the latex obtained. Examples 31 to 34 illustrate the combination of two parts of sulfonate with either a single nonionic hydrophilic or lipophilic compound or two nonionic compounds of close HLB. It was found that the stability of the emulsion during the polymerization was still inadequate and that there was a substantial inhibition at the beginning of the reaction (Examples 32 to 34). When the nonionic compound was lipophilic (Example 32), the latex obtained was not mechanically stable and the particle size was high and not controllable.

The polychloroprenes of Examples 6, 8 and 23 were isolated by coagulation of the latex adjusted to pH=7 on a drum cooled to −20° C. The film obtained was washed and dried. The behavior during the coagulation of the latex was good.

TABLE I

| | EXAMPLES | | | | | | |
|---|---|---|---|---|---|---|---|
| | 4 | 5 | 6 | 7 | 8 | 9 | 10 |
| Chloroprene | 98 | 98 | 98 | 98 | 98 | 97 | 95 |
| Methacrylic acid | 2 | 2 | 2 | 2 | 2 | 3 | 5 |
| Softened water | 94 | 94 | 94 | 94 | 94 | 94 | 94 |
| n-Dodecyl mercaptan | 0.2 | 0.2 | 0.2 | 0.2 | 0.2 | 0.2 | 0.2 |
| Secondary n-alkanesulfonate (1) | 1.6 | 1.8 | 2 | 2.5 | 2 | 2 | 2 |
| Tributylphenol polyglycol ether (HLB = 8) (2) | 2 | 2 | 2 | 2 | 1.25 | 1.25 | 1.25 |
| Tributylphenol polyglycol ether (HLB = 17) (3) | 1 | 1 | 1 | 1 | 1.25 | 1.25 | 1.25 |
| Conversion (%) | 98.9 | 99.5 | 97.2 | 99.7 | 99.7 | 99.8 | 97.0 |
| Final solids content (%) | 51.4 | 50.8 | 50.9 | 53.2 | 54.7 | 51.3 | 49.5 |
| Polymerization time (h) | 9 | 8 | 8 | 6 | 7 | 9 | 7 |
| Weight of coagulates formed during the polymerization (g) | 0 | 0 | 0 | 0 | 0 | 0 | 0 |
| Particle diameter (nm) | 185 | 150 | 150 | 125 | 175 | 160 | 120 |
| Mechanical stability (%) | | | | | | | |
| pH = 7 | 4 | 0.7 | 0 | 0 | 0.08 | 0 | 0 |
| pH = 12 | 0 | 0 | 0 | 0 | 0 | 0 | 0 |
| Stability to Ca$^{2+}$ ions (ml) | >100 | >100 | >100 | >100 | >100 | >100 | >100 |
| Stability on storage | excellent | excellent | excellent | excellent | excellent | excellent | excellent |

(1) EMULSOGEN EP ® - HOECHST
(2) SAPOGENAT T040 ® - HOECHST
(3) SAPOGENAT T300 ® - HOECHST

TABLE II

| VARIATION IN THE PROPORTION OF NONIONIC COMPOUNDS | | | | | | |
|---|---|---|---|---|---|---|
| | EXAMPLES | | | | | |
| | 1 | 11 | 12 | 13 | 14 | 15 |
| Chloroprene | 98 | 98 | 98 | 98 | 98 | 98 |
| Methacrylic acid | 2 | 2 | 2 | 2 | 2 | 2 |
| Softened water | 65 | 65 | 65 | 65 | 65 | 65 |
| n-Dodecyl mercaptan | 0.2 | 0.2 | 0.2 | 0.2 | 0.2 | 0.2 |
| Secondary n-alkanesulfonate (1) | 2 | 2 | 2 | 2 | 2 | 2 |
| PEO/PPO/PEO block polymer (HLB = 8.3) (2) | 1.25 | 1.8 | 1.25 | 0.97 | 0.93 | 0.92 |
| PEO/PPO/PEO block polymer (HLB = 2.7) (3) | 1.25 | 1.2 | 0.5 | 0.72 | 1.44 | 0.98 |
| Conversion (%) | 99.0 | 97.7 | 97.8 | 96.0 | 95.0 | 97.5 |
| Final solids content (%) | 61.0 | 59.0 | 59.0 | 57.1 | 57.0 | 58.5 |
| Polymerization time (h) | 10 | 12 | 10 | 11 | 18 | 9 |

TABLE II-continued

VARIATION IN THE PROPORTION OF NONIONIC COMPOUNDS

| | EXAMPLES | | | | | |
|---|---|---|---|---|---|---|
| | 1 | 11 | 12 | 13 | 14 | 15 |
| Weight of coagulates formed during the polymerization (g) | 0 | 0 | 0 | 0 | 0 | 0 |
| Particle diameter (nm) | 150 | 185 | 200 | 195 | 225 | 160 |
| Mechanical stability (%) | | | | | | |
| pH = 3 | 0.5 | 0.7 | 0.9 | 0.6 | 0.8 | 0.7 |
| pH = 7 | 0 | 0.2 | 0.5 | 0.2 | 0.4 | 0.4 |
| pH = 12 | 0 | 0 | 0 | 0 | 0 | 0 |
| Stability to $Ca^{2+}$ ions (ml) | >100 | >100 | >100 | >100 | >100 | >100 |
| Stability on storage | excellent | excellent | excellent | excellent | excellent | excellent |

(1) EMULSOGEN EP ® - HOECHST
(2) PLURONIC 6400 ® - BASF
(3) PLURONIC 3100 ® - BASF

TABLE III

VARIATION IN THE NATURE OF NONIONIC COMPOUNDS

| | EXAMPLES | | | | | | |
|---|---|---|---|---|---|---|---|
| | 16 | 17 | 18 | 19 | 20 | 21 | 22 |
| Chloroprene | 98 | 98 | 98 | 98 | 98 | 97 | 98 |
| Methacrylic acid | 2 | 2 | 2 | 2 | 2 | 2 | 2 |
| Softened water | 94 | 94 | 94 | 94 | 94 | 65 | 65 |
| n-Dodecyl mercaptan | 0.2 | 0.2 | 0.2 | 0.2 | 0.2 | 0.2 | 0.2 |
| Secondary n-alkanesulfonate (1) | 2 | 2 | 2 | 2 | 2 | 2 | 2 |
| Sorbitan monostearate (HLB = 4.7) (2) | — | — | — | 1.5 | 1.5 | — | — |
| Tributylphenol polyglycol ether (HLB = 8) (3) | 1.5 | 1.5 | 1.5 | — | — | — | — |
| Alkylphenoxypolyethoxyethanol (HLB = 13.5) (4) | — | — | — | — | — | 0.7 | 1.4 |
| Tributylphenol polyglycol ether (HLB = 17) (5) | 1.5 | — | — | — | — | — | — |
| Ethoxylated nonylphenol (HLB = 17) (6) | — | 1.5 | — | 1.5 | — | — | — |
| Ethoxylated octylphenol (HLB = 18) (7) | — | — | 1.5 | — | 1.5 | 1.4 | 0.7 |
| Conversion (%) | 98.4 | 99.0 | 97.7 | 99.8 | 99.7 | 97.8 | 98.0 |
| Final solids content (%) | 49.2 | 44.0 | 46.7 | 49.0 | 49.5 | 58.0 | 58.9 |
| Polymerization time (h) | 5 | 7 | 5 | 5.5 | 6 | 15 | 13 |
| Weight of coagulates formed during the polymerization (g) | 0 | 0 | 0 | 0 | 0 | 0 | 0 |
| Particle diameter (nm) | 125 | 168 | 175 | 122 | 145 | 193 | 195 |
| Mechanical stability (%) | | | | | | | |
| pH = 7 | 0.05 | 0.03 | 0.08 | 0.06 | 0.04 | 0 | 0.1 |
| pH = 12 | 0 | 0 | 0 | 0 | 0 | 0 | 0 |
| Stability to $Ca^{2+}$ ions (ml) | >100 | >100 | >100 | >100 | >100 | >100 | >100 |
| Stability on storage | excellent | excellent | excellent | excellent | excellent | excellent | excellent |

(1) EMULSOGEN EP ® - HOECHST
(2) DISPONIL 100 ® - SIDOBRE SINNOVA
(3) SAPOGENAT TO40 A ® - HOECHST
(4) DISPONIL SMS 120 ® - SIDOBRE SINNOVA
(5) SAPOGENAT T300 ® - HOECHST
(6) SINNOPAL NP 307 ® - SIDOBRE SINNOVA
(6) SINNOPAL OP 407 ® - SIDOBRE SINNOVA

TABLE IV

VARIATION IN THE AMOUNT OF WATER

| | EXAMPLES | | | |
|---|---|---|---|---|
| | 23 | 24 | 25 | 26 |
| Chloroprene | 98 | 98 | 98 | 98 |
| Methacrylic acid | 2 | 2 | 2 | 2 |
| Softened water | 94 | 70 | 60 | 55 |
| n-Dodecyl mercaptan | 0.2 | 0.2 | 0.2 | 0.2 |
| Secondary n-alkanesulfonate (1) | 2 | 2 | 2 | 2 |
| Tributylphenol polyglycol ether (HLB = 8) (2) | 1.4 | 1.4 | 1.4 | 1.4 |
| Tributylphenol polyglycol ether (HLB = 17) (3) | 0.7 | 0.7 | 0.7 | 0.7 |
| Conversion (%) | 95.8 | 95.2 | 95.5 | 97.5 |
| Final solids content (%) | 48.5 | 55.0 | 58.8 | 61.4 |
| Polymerization time (h) | 9 | 13 | 14 | 13 |
| Weight of coagulates formed during the polymerization (g) | 0 | 0 | 0 | 0 |
| Particle diameter (nm) | 192 | 200 | 210 | 220 |
| Mechanical stability (%) | | | | |
| pH = 3 | 1.5 | 0.7 | 1.5 | 2 |
| pH = 7 | 0.12 | 0.10 | 0.10 | 0.15 |
| pH = 12 | 0 | 0 | 0 | 0 |
| Stability to $Ca^{2+}$ ions (ml) | >100 | >100 | >100 | >100 |

TABLE IV-continued

VARIATION IN THE AMOUNT OF WATER

| | EXAMPLES | | | |
|---|---|---|---|---|
| | 23 | 24 | 25 | 26 |
| Stability on storage | excellent | excellent | excellent | excellent |

(1) EMULSOGEN EP ® - HOECHST
(2) SAPOGENAT TO40 ® - HOECHST
(3) SAPOGENAT T300 ® - HOECHST

TABLE V

COMPARATIVE EXAMPLES

| | EXAMPLES | | | | | | | |
|---|---|---|---|---|---|---|---|---|
| | 27 | 28 | 29 | 30 | 31 | 32 | 33 | 34 |
| Chloroprene | 100 | 100 | 98 | 98 | 98 | 98 | 98 | 100 |
| Methacrylic acid | — | — | 2 | 2 | 2 | 2 | 2 | 2 |
| Softened water | 150 | 100 | 65 | 65 | 65 | 65 | 69 | 69 |
| n-Dodecyl mercaptan | 0.2 | 0.2 | 0.2 | 0.2 | 0.2 | 0.2 | 0.2 | 0.2 |
| Secondary n-alkanesulfonate (1) | 2 | 2 | 2 | 3 | 2 | 2 | 2 | 2 |
| Tributylphenol polyglycol ether (HLB = 8) (2) | — | — | — | — | — | 2 | 1 | — |
| PEO/PPO/PEO block polymer (HLB = 8.3) (3) | — | — | — | — | — | — | 1 | — |
| Tributylphenol polyglycol ether (HLB = 17) (4) | — | — | — | — | 2 | — | — | 1 |
| Ethoxylated octylphenol (HLB = 18) (5) | — | — | — | — | — | — | — | 1 |
| Conversion (%) | 99.0 | 99.0 | 99.6 | 98.3 | 99.6 | 98.4 | 98.2 | 98.0 |
| Final solids content (%) | 38.6 | 48.6 | 59.6 | 59.0 | 59.0 | 59.1 | 47.1 | 57.0 |
| Polymerization time (h) | 13 | 10 | 13 | 12 | 16 | 15 | 14 | 12 |
| Weight of coagulates formed during the polymerization (g) | 990 | 1,250 | 500 | 50 | 100 | 45 | 55 | 60 |
| Particle diameter (nm) | 112 | 115 | 250 | 108 | 178 | 300 | 215 | 190 |
| Mechanical stability (%) pH = 7 | Solidified | | | 0.6 | * | 2.5 | 0.3 | 0.3 |
| Stability to $Ca^{2+}$ ions (ml) | >100 | >100 | >100 | 5 | >100 | >100 | >100 | >100 |
| Maximum temperature differences between the jacket and the reactor (°C.) | 6 | 7 | 9 | 17 | 10 | 9 | 7 | 9 |
| Inhibition (h) | No | No | No | No | No | 1.5 | 3 | 3 |

(1) EMULSOGEN EP ® - HOECHST
(2) SAPOGENAT TO40 ® - HOECHST
(3) PLURONIC 6400 ® - BASF
(4) SAPOGENAT T300 ® - HOECHST
(5) SINNOPAL OP407 ® - SIDOBRE SINNOVA

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a polychloroprene latex, which comprises polymerizing chloroprene or chloroprene and up to 50% by weight thereof of at least one olefinically unsaturated comonomer copolymerizable therewith, in aqueous emulsion, in the presence of a free-radical initiator and at least one emulsifying agent, said aqueous emulsion further comprising (a) at least one non-carboxylic ionic surfactant and (b) at least two nonionic surfactants, the HLB values thereof differing by at least 3 units.

2. The process as defined by claim 1, said aqueous emulsion comprising, per 100 parts by weight of said monomer(s), 1 to 3 parts by weight of non-carboxylic ionic surfactant (a) and 1 to 3 parts by total weight of said at least two nonionic surfactants (b) having a difference in HBL values of at least 3 units.

3. The process as defined by claim 1, said at least one surfactant (a) comprising a $C_8$–$C_{25}$ alkyl sulfate or alkylsulfonate.

4. The process as defined by claim 1, said difference in HLB values between s id at least two surfactants (b) being more than 4 units.

5. The process as defined by claim 1, one of said at least two nonionic surfactants.(b) being hydrophilic and another such nonionic surfactant (b) being lipophilic.

6. The process as defined by claim 1, comprising copolymerizing chloroprene with an $\alpha,\beta$-unsaturated monocarboxylic or dicarboxylic acid.

7. The process as defined by claim 6, comprising copolymerizing chloroprene with methacrylic acid.

8. The process as defined by claim 6, comprising copolymerizing chloroprene with an alkyl (meth)acrylate having from 1 to 6 carbon atoms in the alkyl moiety thereof.

9. The process as defined by claim 1, said aqueous emulsion comprising from 50% to 95% of water relative to the weight of monomer(s).

10. The process as defined by claim 1, comprising carrying out said polymerization to a degree of conversion of at least 95%.

11. The chloroprene polymer latex produced by the process as defined by claim 1.

12. The process as defined in claim 1, wherein said at least one non-carboxylic ionic surfactant is present in an amount of less than 2.8 parts per 100 parts by weight of said monomer(s).

13. The process was defined by claim 12, wherein said at least one non-carboxylic ionic surfactant is present in an amount of from 1 to 2.8 parts per 100 parts by weight of said monomer(s).

14. The process as defined in claim 13, wherein said at least one non-carboxylic ionic surfactant is present in an amount of from 1.8 to 2.8 parts per 100 parts by weight of said monomer(s).

* * * * *